United States Patent
Richardson

(10) Patent No.: US 7,894,557 B2
(45) Date of Patent: Feb. 22, 2011

(54) SIGNAL INTERFERENCE MEASUREMENT

(75) Inventor: Michael Richard Richardson, Romsey (GB)

(73) Assignee: BAE Systems PLC, London (GB)

(*) Notice: Subject to any disclaimer, the term of this patent is extended or adjusted under 35 U.S.C. 154(b) by 1001 days.

(21) Appl. No.: 10/522,756

(22) PCT Filed: Nov. 19, 2004

(86) PCT No.: PCT/GB2004/004901

§ 371 (c)(1),
(2), (4) Date: Jan. 28, 2005

(87) PCT Pub. No.: WO2005/053190

PCT Pub. Date: Jun. 9, 2005

(65) Prior Publication Data

US 2006/0209998 A1    Sep. 21, 2006

(30) Foreign Application Priority Data

Nov. 21, 2003  (GB) ................................. 0327041.0

(51) Int. Cl.
   *H04B 14/06* (2006.01)
(52) U.S. Cl. .................. 375/350; 375/343; 375/346; 455/67.13; 455/425
(58) Field of Classification Search ......... 375/259–261, 375/130–153, 227, 316, 340, 343, 346, 350, 375/239; 455/403, 422.1, 423–425, 446–448, 455/67.11, 67.13
See application file for complete search history.

(56) References Cited

U.S. PATENT DOCUMENTS

| | | | |
|---|---|---|---|
| 5,390,216 A | * | 2/1995 | Bilitza et al. ................ 375/354 |
| 5,974,087 A | | 10/1999 | Nowara |
| 6,349,207 B1 | * | 2/2002 | Monot et al. ................ 455/423 |
| 6,369,758 B1 | * | 4/2002 | Zhang ........................ 342/383 |
| 6,373,878 B1 | | 4/2002 | Palenius et al. |
| 6,493,876 B1 | * | 12/2002 | DeFreese et al. ............ 725/100 |
| 2002/0041576 A1 | * | 4/2002 | Chang et al. ................ 370/331 |
| 2002/0137485 A1 | | 9/2002 | Nilsson et al. |
| 2003/0020653 A1 | | 1/2003 | Baugh et al. |
| 2004/0161065 A1 | | 8/2004 | Buckley et al. |
| 2004/0166809 A1 | * | 8/2004 | Dickey .................... 455/67.11 |
| 2004/0242203 A1 | * | 12/2004 | Lipsanen et al. ......... 455/412.1 |

FOREIGN PATENT DOCUMENTS

EP    0893703 A    1/1999
WO    WO 99/38270 A1    7/1999

OTHER PUBLICATIONS

ETSI EN 300 744 V 1.4.1 (Jan. 2001).*

* cited by examiner

*Primary Examiner*—David C Payne
*Assistant Examiner*—James M Perez
(74) *Attorney, Agent, or Firm*—Scully, Scott, Murphy & Presser, P.C.

(57) ABSTRACT

Described herein is a method for determining the amount of interference in a received signal that comprises a wanted signal and a plurality of interfering signals. The method comprises selecting a plurality of first known structures in the wanted signal, processing the received signal in accordance with said plurality of first known structures to derive amplitude values corresponding to the said first known structures; and using the amplitude values to determine wanted signal and interfering signal power values. Additionally, a calibration step can be included to convert the power values into absolute power measurements.

10 Claims, 2 Drawing Sheets

SIGNAL INTERFERENCE MEASUREMENT

Figure 1:
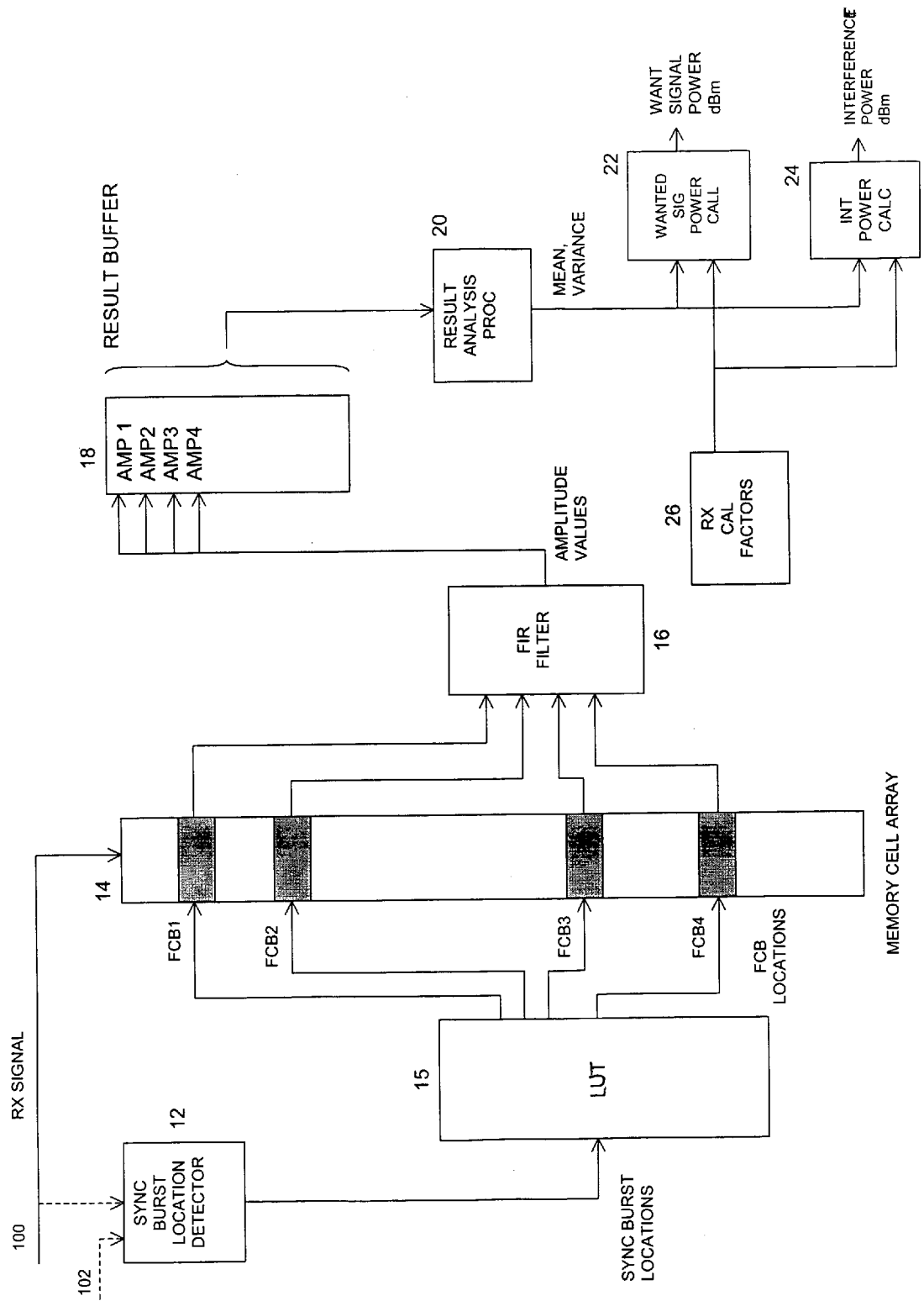

The present invention relates to signal interference measurement, and is more particularly concerned with measuring the amount of wanted signal power interfering signal power in a GSM signal.

In cellular telephone networks, where there are multiple base stations, it is often necessary to resort to the frequent re-use of frequency channels due to the limited amount of frequency spectrum made available to the operators by the regulatory authorities. Thus, the situation will arise where significant interference from signals transmitted from a plurality of base stations using the same channel is present on a wanted signal at the receiver. Such interfering signals will have the same general characteristics as the wanted signal, but will be unsynchronised in time.

It is a common requirement to be able to measure the level of the wanted signal together with the total level of interference present, for example to perform surveys of system coverage, frequency re-use patterns and to assess degradations in system performance due to such interference.

A particular difficulty associated with the measurement of such interference is that the wanted signal is transmitted continuously or with very short breaks and may be received at a significantly higher power level than the interfering signals. For example, such interference may be around 30 dB or more below the level of the wanted signal.

Whilst it may be possible to carry out measurements during guard periods of the wanted transmission, practical experience demonstrates that power assessment is difficult due to the short duration of these guard periods. Moreover, power measurements during the guard periods may be compromised by the response time of the receiver itself, and also by the transmitter transmitting the wanted signal not reducing its power significantly during those periods.

WO-A-99/38270 describes a receiver for receiving a spread spectrum signal which may include unwanted narrow band signals. The technique disclosed processes a narrow band signal that is received by decoding and regeneration prior to signal de-spreading.

US-A-2004/0161065 describes a method for reducing interference in a GSM communication system using a Finite Impulse Response (FIR) filter. Complex training software is required and the technique described demands significant processing capabilities.

The present invention relates to a technique whereby the interference level may be accurately measured over a wide dynamic range of both wanted and interference power levels in the receiver whilst the wanted signal is being continuously received.

According to one aspect of the present invention, there is provided a method of determining the amount of signal power and interference power in a received signal, the received signal having a wanted signal and a plurality of interfering signals, the method comprising the steps of:

a) selecting a plurality of first known structures in the wanted signal;

b) processing the received signal in accordance with said plurality of first known structures to derive a set of amplitude values corresponding to the said first known structures; and c) using the set of amplitude values to determine the power level for at least a portion of the received signal.

Whilst the present invention allows the determination of the power level for at least a portion of the received signal, it is preferred that both the wanted signal power and the interfering signal power are determined.

In a preferred embodiment of the present invention, step a) includes identifying said plurality of first known structures using a further known structure within the wanted signal. Step a) may include identifying locations of a further structure within the wanted signal, and using the identified locations to derive the locations of said plurality of first known structures.

In a GSM signal, said plurality of first known structures may comprise Frequency Correction Bursts (FCBs). The further known structure may then comprise sync bursts.

Preferably, the step of identifying said plurality of first known structures includes using pointer values selected by said further known structure. These values may be derived by access to a Look Up Table (LUT), and step a) may include using said pointer values to select said plurality of first known structures in said received signal.

Optionally, step b) comprises correlating the received signal with said selected plurality of first known structures to derive said set of amplitude values. Naturally, the type of processing will depend on the type of signals that are being processed. In the case of GSM, a FIR filter can be used to correlate the received signal with the FCBs as described above.

As part of the determination of the power value for at least a portion of the received signal, step c) comprises determining mean and variance values for said set of amplitude values. If absolute power values are required, then step c) further comprises using calibration factors to produce an absolute power value for the wanted signal. Furthermore, the calibration factors can be used to produce an absolute power value for the interfering signals.

It will be appreciated that apparatus suitable for carrying out the method described above may comprise an antenna for detecting a received signal that includes a wanted signal and a plurality of interfering signals, means for detecting the first known structure within the wanted signal received at the antenna, and means for processing the received signal to obtain a measure of the amount of interference present in the received signal.

Preferably the known structure, feature or portions of the signal which are detected with in the present embodiment relating to GSM systems are Frequency Correction Bursts (FCBs). Alternative embodiments could exploit other elements of the GSM signal. FCBs are a particular type of bursts of modulation which are incorporated in signals at intervals and are primarily intended for frequency correction purposes in low stability receivers. A particular characteristic of an FCB is that to create the burst, a string of typically 142 modulating bits all with "zero" state is applied to the GMSK modulator at the transmitter in accordance with the relevant ETSI specifications for GSM systems. By identifying the positions of a plurality of such bursts in the wanted signal received at the antenna, and applying these identified portions of the total received signal to an appropriately configured Finite Impulse Response Filter (FIR) or equivalent correlator or other equivalent process, and applying standard statistical analysis techniques to a selected plurality of the amplitude outputs of the FIR, it is possible to obtain estimates of the power levels of the wanted signal as well as the interfering signals.

Furthermore, if the receiver is calibrated using an appropriate test signal with a known, defined power level, it is possible to derive and apply factors to the results of the statistical analysis to obtain estimates of both the wanted signal level and the total interference level in the receiver in terms of absolute power units, preferably dBm.

The positions of the FCBs in the wanted signal are preferably obtained through exploiting other known characteristics of this signal, preferably by identifying the locations of a plurality of synchronisation bursts in the wanted signal, by using well-known techniques commonly employed by GSM receivers, for example by using an FIR or correlation process. Once the positions of a plurality of synchronisation bursts have been established, the positions of all FCBs of interest are obtained from published knowledge of the structure of the transmitted signal.

In many applications of interest, the corruption of the wanted signal by interference will be such that the positions of the synchronisation bursts may be directly identified with the required fidelity. In order to extend the applicability of the invention to cases where the interference levels are such that the synchronisation bursts cannot be so identified, the required information can be preferably obtained using an auxiliary antenna and receiver which is so deployed as to receive a high quality version of the wanted signal from the base station of interest. A particular but not exclusive embodiment of this procedure would be if a directive antenna is used in conjunction with the measurement receiver to perform an azimuthal power scan. In this embodiment an auxiliary receiver with a directive antenna oriented in the direction of the strongest received level of the wanted signal may be used with advantage to ensure that synchronisation burst positions can always be identified, irrespective of the signal and interference levels extant at the antenna of the measurement receiver.

Figure 2:
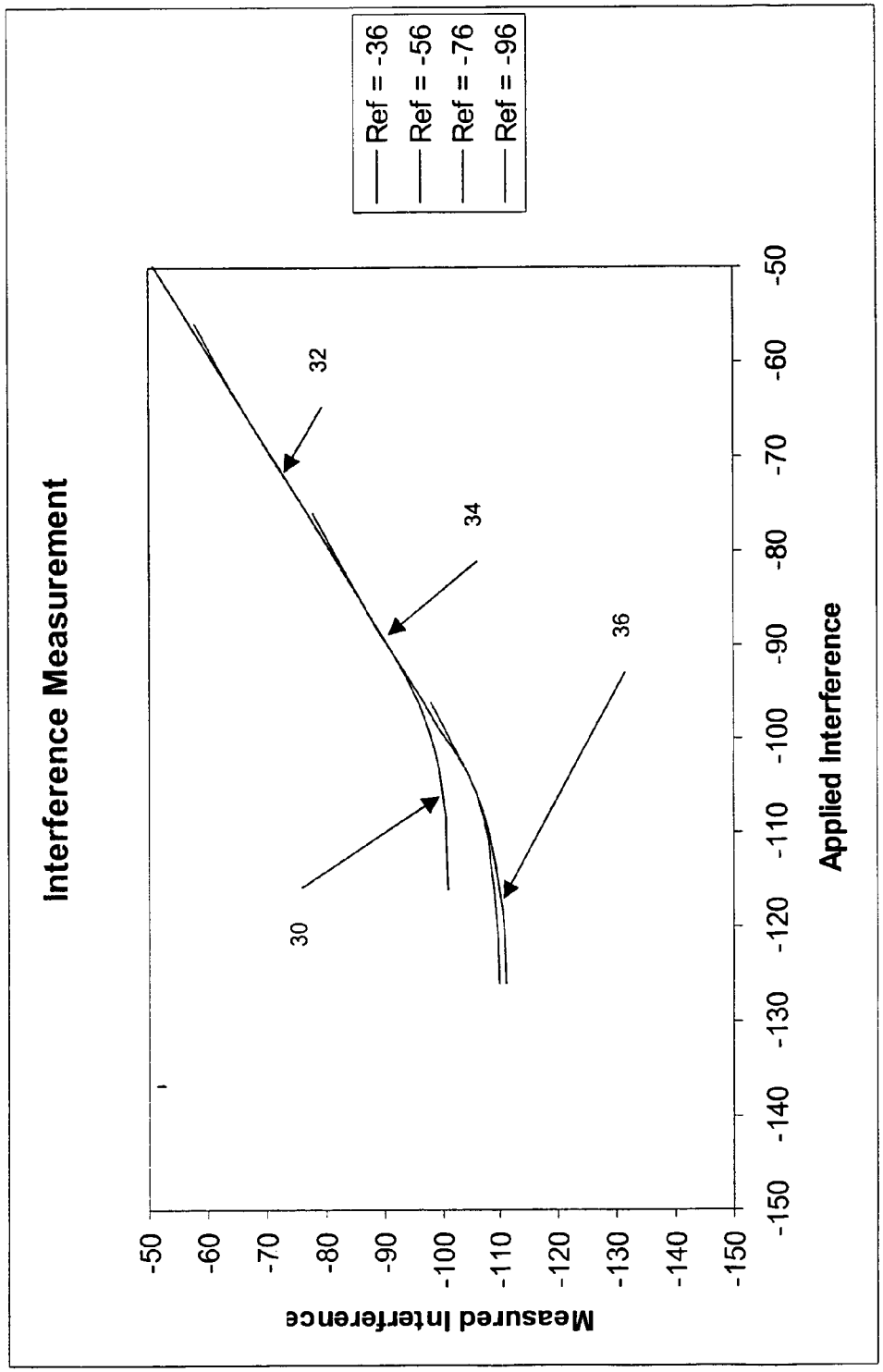

For a better understanding of the present invention, reference will now be made, by way of example only, to the accompanying drawings in which:

FIG. 1 illustrates a block diagram of a signal measurement system in accordance with the present invention; and FIG. 2 illustrates the signal measurement in terms of wanted signal level, applied interfering signal level and measured signal level.

The present invention exploits pre-defined modulation characteristics of certain elements of a GSM signal. For example, the use of Frequency Correction Burst (FCB) is described below, but it will be appreciated that other elements of a GSM signal can be used. Moreover, the present invention is not limited to GSM signals and may have application in other digital cellular systems.

FCBs occur on a regular basis in the BCCH channel of a GSM signal. Each FCB typically has a length of 142 symbols with a specified modulation pattern. This gives known periods of a received signal with defined properties from the wanted transmitter during which signal power measurement can be performed.

The receiver synchronises to the BCCH channel in the normal way using the synchronisation bursts and then locates the positions of the FCBs in the wanted signal component of the received signal. Each received FCB location in the received signal is filtered with a finite impulse filter (FIR) whose weights are the complex conjugate of the FCB signal modulation applied at the transmitter. The output from the filter is then analysed statistically.

If no interference is present, the sequence of outputs will have a constant value which is directly proportional to the amplitude of the wanted received signal. If interference is present, the sequence of outputs will have an additional noise-like component superimposed on them which is generated by the correlation of the FCB filter weights with the essentially independent pseudo-random modulation of the interfering signals.

By measurement of the mean and variance of the filter output over a received signal span including a number of FCBs, the wanted signal and interfering signal levels can be estimated to a high degree of accuracy over a wide dynamic range. Provided that propagation conditions remain stable, measurement accuracy is increased as the measurement timespan is increased.

Referring now to FIG. 1, a GSM signal interference measurement system is shown. The system comprises a sync burst location detector 12, an array of memory cells 14, a look-up table (LUT) 15, an FIR filter 16, a result buffer 18, a result analysis processor 20, a wanted signal power calculator 22, an interference power calculator 24 and a table of receiver calibration factors 26.

A suitable set of samples of the total received signal 100 from the measurement receiver having an antenna from which it is fed (not shown) is passed to the sync burst location detector 12 so that the sync burst locations in the wanted signal can be detected and fed to LUT 15. The received signal 100 is also fed to the memory cell array 14 where it is stored.

As the LUT 15 is connected to the memory cell array 14, information on the locations of sync bursts is supplied by the sync burst location detector 12 to the LUT 15. The LUT 15 contains published information on the structure of the GSM signal and permits the locations of the FCBs in the sample sets in the total set of signal samples stored in the memory array 14 to be determined.

It will be appreciated that although only four FCBs are shown in FIG. 1, any number of FCBs can be utilised but it is preferred that the number is as great as possible to enhance the subsequent statistical processing.

Each of the plurality of sample sets that contain FCB symbols in the wanted signal component of the received signal is extracted and passed from the memory array 14 to the FIR filter 16. The purpose of the of the FIR filter 16 is to cross-correlate the known signal structure of an FCB with a set of received signal samples and compute the amplitude of the result.

After filtering in the FIR filter 16, the resulting plurality of FIR amplitude output values is stored in the result buffer 18. These stored values are then supplied to the result analysis processor 20. (It is well known in the art that a FIR filter also operates as a correlator.)

The result analysis processor 20 calculates the mean and variance values of the amplitude values stored in the result buffer 18.

If no interference is present, the amplitudes of the succession of a plurality of outputs of the FIR filter 16 will have a substantially constant value when a plurality of received signal sample sets containing FCB data is supplied to it. The mean of the set of amplitude values so obtained is proportional to the amplitude of the wanted received signal.

If interference is present, however, each of the set of amplitude values will have an additional random component superimposed thereon. The random component is generated by the cross-correlation of the known signal structure of an FCB with the essentially pseudo-random modulation present on interfering signals. The variance of the set of amplitude values so obtained is proportional to the power of the interfering signal.

The present invention exploits the fact that GSM base stations are not time synchronised to each other and the proportion of the transmitted signal dedicated to FCBs is very small, so that the probability of the FCBs in the wanted signal being in, and remaining in, alignment with the FCBs in the interfering signal is small and can be discounted for practical purposes.

The mean value is supplied to the wanted signal power calculator, which converts the mean value to a power value and preferably also applies calibration factors from the receiver calibration table 26 to convert the wanted signal power value to absolute power units, preferably in dBm.

Similarly, the variance value is supplied to the interference power calculator, which converts the variance value to a power value and preferably also applies calibration factors from the receiver calibration table 26 to convert the interference power value to absolute power units, preferably in dBm.

In a further embodiment of the invention, if the antenna is located such that it may not receive a significant level or any of the wanted signal, for example, if the antenna has directive gain and is scanned in azimuth, a second received signal 102 is required for feeding wanted signal to the sync burst location detector 12. The second received signal 102 may be a time co-incident set of signal samples of the wanted signal from the base station supplied from an auxiliary receiver (not shown).

From tests carried out at different reference power levels, it has been determined that the dynamic range and linearity of the system illustrated and described with reference to FIG. 1 is typically as shown in the table of the results below:

| Interference Power dbm | Ref = −36 | Ref = −56 | Ref = −76 | Ref = −96 |
| --- | --- | --- | --- | --- |
| −36 | −37 | | | |
| −46 | −47 | | | |
| −56 | −57 | −58 | | |
| −66 | −67 | −67 | | |
| −76 | −77 | −77 | −78 | |
| −86 | −87 | −87 | −87 | |
| −96 | −96 | −97 | −97 | −98 |
| −106 | −100 | −106 | −106 | −106 |
| −116 | −101 | −109 | −110 | −110 |
| −126 | | −110 | −111 | −111 |

The 'Ref' column headings identify the various wanted signal power levels used in the tests, and the results are illustrated graphically in FIG. 2. Reference numeral 30 refers to 'Ref=−36'; reference numeral 32 refers to 'Ref=−56'; reference numeral 34 refers to 'Ref=−76'; and reference numeral 36 refers to 'Ref=−96'.

The invention claimed is:

1. In a cellular telephone system comprising at least one antenna for detecting a received signal and a signal processor for processing the received signal detected by the at least one antenna, a method of determining the amount of signal power and interference power in the received signal, the received signal having a wanted signal providing said signal power and a plurality of interfering signals providing said interference power, the wanted signal being encoded such that there is a channel structure including a broadcast control channel, the method comprising use of the signal processor in the steps of:
    a) selecting a plurality of portions having a first known structure in said received signal, said plurality of portions comprising Frequency Correction Bursts, said plurality of portions being identified using a further known structure within the broadcast control channel to provide a signal having known periods with defined properties, said further known structure comprising sync bursts;
    b) processing said plurality of portions to derive a set of amplitude values corresponding to said first known structure; and
    c) determining both said signal power level and said interference power level from said derived set of amplitude values.

2. A method according to claim 1, wherein step a) includes identifying locations of the further known structure within the received signal, and using the identified locations to derive the locations of said plurality of portions.

3. A method according to claim 1, wherein the step of identifying said plurality of portions includes using pointers selected by said further known structure.

4. A method according to claim 3, wherein said pointers are stored in a look-up table, and step a) includes using said pointers to select said plurality of portions.

5. A method according to claim 1, wherein step b) comprises correlating the received signal with said selected plurality of portions to derive said amplitude values.

6. A method according to claim 1, wherein step c) comprises determining mean and variance values for said amplitude values.

7. A method according to claim 1, wherein step c) further comprises using calibration factors to produce an absolute power value for the wanted signal.

8. A method according to claim 1, wherein step c) further comprises using said calibration factors to produce an absolute power value for the interfering signals.

9. A method according to claim 1, the method further comprising the step of using at least two antennas in time-coincident manner to detect the received signal comprising the wanted signal and plurality of interfering signals.

10. A method according to claim 1, wherein step c) comprises determining said signal and interference power levels from mean and variance values for said derived set of amplitude values.

* * * * *